Aug. 31, 1937.  S. J. DURITZA  2,091,913
RUBBER SEALING RING
Filed Nov. 15, 1935

Inventor.
Stephen J. Duritza.
by Kenway & Witter
Attorneys.

Patented Aug. 31, 1937

2,091,913

UNITED STATES PATENT OFFICE 2,091,913

RUBBER SEALING RING

Stephen John Duritza, Struthers, Ohio, assignor to Boston Woven Hose & Rubber Corporation, Cambridge, Mass., a corporation of Massachusetts Application November 15, 1935, Serial No. 50,005

1 Claim. (Cl. 215—37)

This invention relates to rubber sealing rings for use in sealing preserving jars. Such jars are commonly unsealed by forcing a knife inwardly of the sealing ring, whereby to permit air to enter the jar and break the vacuum and, in order to avoid this dangerous practice, a ring having a lip projecting outwardly from its outer peripheral portion has been suggested. Unsealing of the jar is performed with this ring by gripping the lip and pulling outwardly thereon sufficiently to thin the ring and permit the entrance of air into the jar. One great disadvantage with such a ring is that a lip sufficiently large to be gripped without the use of pliers or like mechanical means is very bulky and therefore difficult to package. It has been suggested that this lip be punched to receive a hook for unsealing purposes, but this expedient has never found favor.

My invention herein disclosed has for its object the production of a rubber sealing ring which embodies little more than the body portion of the ring and can therefore be conveniently manufactured and packaged in the manner customary with sealing rings of this nature, and which can be easily and conveniently manipulated solely by hand to unseal a jar to which it is applied. As hereinafter more particularly described, the ring has a lip cleft or divided inwardly preferably to a point adjacent to the body portion of the ring whereby the two lip portions thus produced may be grasped by the fingers of the two hands and easily pulled apart in a manner tearing the ring apart and thereby unsealing the jar.

These and other features of the invention will be best understood and appreciated from the following description of a preferred embodiment thereof, selected for purposes of illustration, and shown in the accompanying drawing in which,—

Figure 1:
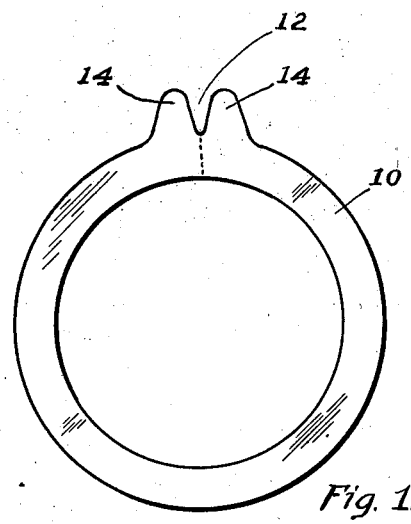
Fig. 1 illustrates one preferred form of my improved sealing ring.

Referring now more particularly to the drawing, 10 indicates a flat rubber sealing ring of the nature commonly used in sealing fruit jars. Integral with and projecting outwardly from the outer peripheral edge of the ring is a lip bifurcated by an open recess 12 therein providing two furcations or gripping tabs 14 of similar size and shape located on opposite sides of the recess. The recess is substantially V-shaped with walls converging inwardly to a point. The unsealing of a jar utilizing this ring is effected by grasping the tabs 14 in the fingers of the two hands and pulling them in opposite directions tangentially of the ring whereupon the ring is split or torn apart, as along the dotted line indicated in Fig. 1 and the jar thereby unsealed. A substantially V-shaped recess is preferred since the effect of such recess is to concentrate the tearing strain in the very small area at the vertex of its recess so that the ring may be torn easily by the application of small force to the divergent tabs. At the same time the fact that the inner periphery of the ring is intact insures sufficient strength in the ring to withstand ordinary wear and tear and the strain of original application to the jar.

Figure 2:
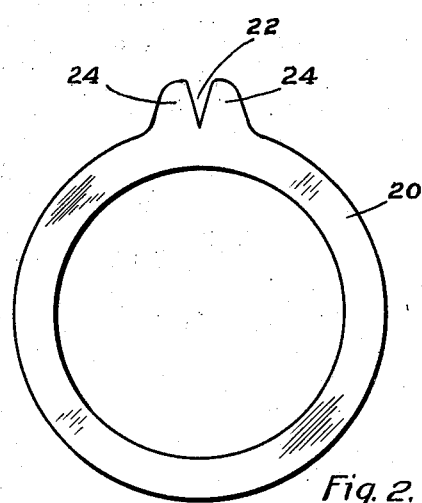
Fig. 2 illustrates a slight modification thereof.

The ring 20 shown in Fig. 2 is similar to the ring of Fig. 1 except that the recess 22 is more sharply V-shaped, particularly at the apex of the V.

Figure 3:
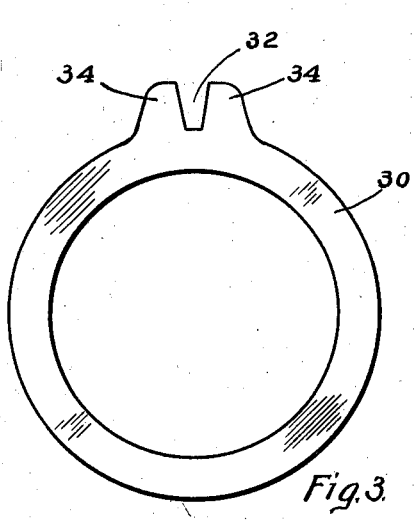
Figs. 3 and 4 illustrate further modified forms of the invention.

The ring 30 shown in Fig. 3 has a recess 32 of substantially rectangular outline and providing two tabs 34.

Figure 4:
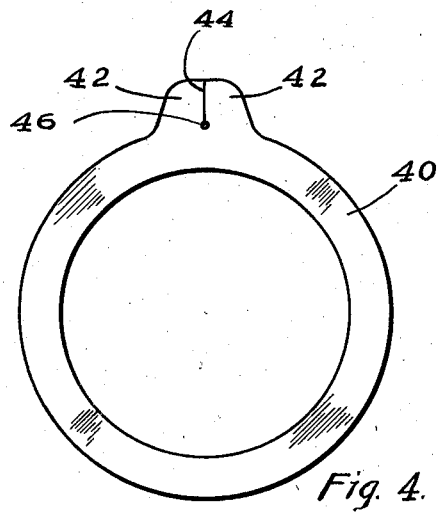

In Fig. 4 the ring 40 is provided with a lip bifurcated to produce two tabs 42, the bifurcation being a slit 44 which may have a perforation 46 of any desired shape at its inner end.

It will be noted that in all forms of the invention the two tabs are separated by opposed edges leading inwardly to a common point and these edges are so arranged that the mean line therebetween extends radially of the ring or substantially so whereby the ring will be torn straight across at said point.

While, as stated above, the V-shaped recess is believed to be preferable, it is to be understood that the lip may be bifurcated in any manner efficiently serving the functions of tearing the ring apart and unsealing the jar. It will also be understood that the rings may be manufactured in any convenient and suitable manner.

The rings will ordinarily be sliced from tubular and preshaped vulcanized stock, and any convenient process may be employed for forming the ring recesses. The tube may be provided with a groove molded thereinto prior to vulcanization, or buffed or otherwise formed therein after vulcanization, which groove will provide the recess in each ring, or the recess may be formed in each ring individually after it is sliced from the tube. The preferred and most economical process, however, is to tube the tubular stock to a cross section corresponding to that of the complete ring desired, then vulcanize the tube, and thereafter slice the individual rings therefrom. It will be readily apparent that the improved one piece rubber ring comprising my invention is particularly adapted to be economically manufactured in this manner.

Having thus described my invention what I claim as new and desire to secure by Letters Patent of the United States, is,—

A one piece jar ring comprising solely a flat annular rubber ring having a pair of tabs integral therewith and projecting outwardly from its periphery, the tabs being separated by opposed edges leading inwardly toward a common point and thus concentrating in small area tearing strain exerted on the ring by pulling the tabs apart, the mean line between said opposed edges extending radially of the ring.

STEPHEN JOHN DURITZA.